(12) United States Patent
Dufresne et al.

(10) Patent No.: US 6,403,515 B1
(45) Date of Patent: Jun. 11, 2002

(54) PROCESS FOR TREATING A CATALYST OR AN ADSORBENT IN A FLUIDIZED BED

(75) Inventors: Pierre Dufresne, Valence; Jean Darcissac, St Georges les Bains, both of (FR)

(73) Assignee: Institut Francais du Petrole, Rueil-Malmaison (FR)

( * ) Notice: Subject to any disclaimer, the term of this patent is extended or adjusted under 35 U.S.C. 154(b) by 0 days.

(21) Appl. No.: 09/420,803

(22) Filed: Oct. 19, 1999

Related U.S. Application Data

(60) Provisional application No. 60/118,646, filed on Feb. 4, 1999.

(30) Foreign Application Priority Data

Oct. 20, 1998 (FR) .............................................. 98 13182

(51) Int. Cl.[7] .......................... B01J 20/34; B01J 38/30; B01J 38/42; B01J 38/12; B01J 38/16
(52) U.S. Cl. .............................. 502/41; 502/34; 502/35; 502/38; 502/51; 502/53; 502/55
(58) Field of Search .............................. 502/34, 35, 38, 502/41, 51, 53, 55

(56) References Cited

U.S. PATENT DOCUMENTS

| | | | | |
|---|---|---|---|---|
| 2,419,245 A | | 4/1947 | Arveson ..................... 252/242 |
| 3,527,694 A | | 9/1970 | Luckenbach ................. 208/118 |
| 4,026,821 A | | 5/1977 | Schoofs et al. ............. 252/419 |
| 5,030,338 A | * | 7/1991 | Harandi et al. ............... 502/21 |
| 5,286,691 A | | 2/1994 | Harandi et al. ............... 502/41 |
| 5,365,006 A | * | 11/1994 | Serrand ....................... 565/501 |
| 5,868,922 A | * | 2/1999 | Glass, Jr. et al. ........... 208/113 |
| 5,958,816 A | * | 9/1999 | Neuman et al. ............... 502/38 |
| 6,117,809 A | * | 9/2000 | Sechrist et al. ............... 502/35 |

FOREIGN PATENT DOCUMENTS

| WO | 92/01511 | 2/1992 |
|---|---|---|
| WO | 94/20213 | 9/1994 |
| WO | 97/39300 | 10/1997 |

\* cited by examiner

*Primary Examiner*—Steven P. Griffin
*Assistant Examiner*—Jonas N. Strickland
(74) *Attorney, Agent, or Firm*—Millen, White, Zelano & Branigan, P.C.

(57) ABSTRACT

The invention concerns a process for fluidising a catalyst or an adsorbent in a furnace which is fixed but the fluidised bed advances, optionally with rotation, in the presence of another inert solid with a granulometry which is different from that of the catalyst or the adsorbent, in the presence of a fluidisation gas, to carry out either stripping of a catalyst or an adsorbent or regeneration of a catalyst or an adsorbent in the furnace.

9 Claims, No Drawings

PROCESS FOR TREATING A CATALYST OR AN ADSORBENT IN A FLUIDIZED BED

CROSS REFERENCE TO RELATED APPLICATION

Priority is claimed under 35 U.S.C. 119(e) of U.S. Provisional Application No. 60/118,646 filed Feb. 4, 1999.

The present invention relates to a process for bringing into contact, with subsequent agitation, of a pulverulent catalytic mass or a mass of a pulverulent adsorbent (pulverulent means that the mass of the solid is in the form of particles such as a powder, extruded grains, beads, dragees, pellets, etc . . . ), the process consisting of agitating the solid in a particular manner.

This process is particularly applicable to stripping particles which are to be separated from a reaction effluent or to regeneration or activation or reactivation or rejuvenation of a catalyst or an adsorbent.

In general for this type of treatment, the catalyst or adsorbent is agitated or swirled in a furnace, in particular in a rotary furnace and for example a louvre type furnace as described in U. S. Pat. No. 4,551,437, in the presence of the reactants necessary for regeneration, activation, reactivation, or rejuvenation, i.e., air or a gas containing oxygen which may or may not be diluted by an inert gas such as nitrogen or any gas capable, for example, of burning the sulphur-containing and carbon-containing contaminants, and under the appropriate operating conditions regarding temperature, pressure, flow rates etc., to carry out this type of impurity burning.

It has been shown that to carry out this type of regeneration or similar treatment or to carry out stripping, it is advantageous to operate such that the catalyst or adsorbent is in the form of a fluid or fluidised bed, as this technology effects excellent heat and matter transfer.

Fluidised bed technology to carry out hydrocarbon conversion reactions is well known, only one example being fluid catalytic cracking. Thus a variety of patents describe that type of arrangement: WO 94-20213, WO 97-39300 and U.S. Pat. No. 4,925,632.

The invention provides a process for bringing a first pulverulent solvent selected from the group formed by catalysts and adsorbents into contact, in a vessel, with a second pulverulent solid with a different granulometry, generally lower than that of the first solid, in the presence of at least one gas.

This process, which causes said solids to move, is particularly applicable to stripping catalysts or adsorbents, or to regeneration of catalysts and adsorbents, or to activation or reactivation or rejuvenation of catalysts or adsorbents.

In this process for bringing particles of a catalyst or an adsorbent into contact with particles of another pulverulent solid, said contact is carried out in a vessel, in the form of a fluid bed by means of a fluidisation gas, the particles of said other pulverulent solid having a granulometry which is different from that of the catalyst or adsorbent particles.

The invention thus essentially concerns bringing pulverulent particles of at least one first solid selected from the group formed by catalysts and adsorbents into contact, with movement, preferably in a fluid or fluidised bed, with inert particles of at least one second solid, the particle size (granulometry) of which is sufficiently different from that of the catalyst or adsorbent to be able subsequently to separate the two solids easily, in particular by screening, in the presence of a gas which is capable of fluidising the two solids, for example air, an inert gas or any gas containing molecular oxygen.

This process can be carried out to effect stripping of a catalyst or any other solid with a view to separating this catalyst or this solid from the gaseous or reacting reactants with which they previously had been brought into contact. Stripping seeks to remove hydrocarbons still present on the catalyst, in particular using any suitable gas, for example air (preferably hot air) or under the action of an inert gas, such as nitrogen, or under the action of steam or carbon dioxide. This process can also be carried out to effect regeneration, reactivation, activation or rejuvenation of a catalyst or an adsorbent.

The second solid can, for example, be alumina, silica, magnesia, sand, mixtures thereof, and dust or fines of these catalysts. In general, the maximum dimension of the particles of the second solid is half that of the smallest dimension of the first solid.

The vessel in which the two solids and the gas such as air are brought into contact is any suitable vessel in which the solids and gases can be agitated. Advantageously, it is a furnace provided at its bottom with a gas distribution system which can fluidise a bed of solid particles.

In a preferred aspect of the invention, the process consists of gradually, periodically or continuously introducing said first solid (catalyst or adsorbent) and said second inert solid at one point (for example one end) of a furnace, together or separately, which gradually advance, i.e., continuously or intermittently (periodically) towards the other end of the furnace. The two types of solids are thus introduced into the vessel, continuously or batchwise, and they gradually, continuously or in batches, advance inside the vessel up to a further point in the furnace (for example to its other end) where they are gradually removed. At least one gas is introduced to at least one point in the furnace, preferably a plurality of points of this furnace, to fluidise the solids. The gas which passes through the catalytic bed has two functions: firstly, fluidisation of the bed to thus ensure good heat and matter transfer in the bed, and secondly as a reactant to participate in the desired reactions in the application under consideration.

When the application is to stripping of a solid containing hydrocarbons, for example, the gas is advantageously air at a moderate temperature or an inert gas such as nitrogen or steam, or finally a mixture of these gases. When the application is to regeneration of a solid containing carbon-containing and sulphur-containing deposits, the gas must be an oxidising gas to permit combustion reactions and in particular it must contain oxygen. The reaction kinetics of carbon and sulphur elimination are controlled by the composition of the gaseous mixture, for example a mixture constituted by greater or lesser quantities of air, nitrogen (to slow down the reaction), and oxygen (to accelerate the reaction). When the application is too activation, reactivation, or rejuvenation, specific reactive gases can be used, either alone or as a mixture, for example hydrogen, hydrogen sulphide, ammonia, chlorine-containing compounds . . . At the vessel outlet, where the first solid (catalysts or adsorbent) and the inert solid are removed, the two solids can be separated by screening, the catalyst or the stripped solid or the catalyst, or the regenerated or reactivated or activated or rejuvenated adsorbent being recovered, also the inert solid. Advantageously, at least a portion of the inert solid is recycled to the catalyst or adsorbent treatment vessel. This in particular retains a suitable heat level.

In accordance with the present invention, it will be noted that the catalyst or adsorbent can be treated in one vessel or in a number of vessels in series, if a single vessel is not sufficient. It is also possible to pass the catalyst or adsorbent through the same vessel several times.

Inside the vessel in which the solid to be treated (catalyst or adsorbent) is brought into contact with the fluidisation gas, and in particular in the case when this vessel is a rotary furnace, where solids are introduced at one end of the furnace, internal means such as baffles are advantageously disposed in the furnace or vessel to force the catalyst or adsorbent to circulate from the entry point into the vessel to the outlet point. These internal means can, for example, be a simple metal plate, or (at least) two plates disposed across the vessel, for example, which thus divide the vessel or furnace (for example cylindrical) into 2 or (at least) four zones, The temperature in the vessel is regulated in different manners: firstly, the quantity of external energy supplied to the system by the electrical resistances, gas burners, exchangers or any other suitable means; secondly the quantity of energy extracted from the system by cooling systems such as tube or plate exchangers traversed by a cooling fluid such as air, steam, water or oil; finally, the gas composition, the flow rate of the solid to be treated and the flow rate of the inert solid recycle. To regenerate the catalyst, for example, it is possible to operate at 500° C. with solids which pass through the vessel in about 1 or 2 hours. If regeneration is involved, the gas containing molecular oxygen is introduced in a quantity sufficient to obtain stoichiometric burning of the carbon-containing and sulphur-containing deposits, or at least a 50% burning rate.

The essential feature of the present invention is to have a sufficient gas flow rate to ensure fluidisation of the first solid and a sufficient gas flow rate to ensure at least 50% combustion of the carbon-containing and sulphur-containing deposits.

An alumina can be used as the inert solid, such as an electrofused alumina (for example with a density of 1700 kg/m$^3$ and with a granulometry of less than 500 microns, preferably 20 to 300 microns, more particularly with an average granulometry of 150 microns). As indicated above, it can also be sand or other solids with granulometries of the same order of magnitude as for the alumina. It is also possible to use a product analogous to the catalyst used in catalytic cracking oil refining units with a granulometry of about 50–80 microns, for example. It is also possible to use fines or dust obtained during manipulation or treatment of various products and in particular products of the same nature as those which are to be treated, namely catalysts or adsorbents. The granulometrical distribution will be adjusted by known techniques for separating pulverulent solids, such as cycloning or screening.

The fluidisation gas flow rates required in the present invention are much lower than those normally used for fluidisation in the absence of a second, inert, solid. By way of example: a linear velocity of 1 m/s (metres per second) is required to fluidise extrudates with a diameter of 1.6 mm with an apparent density of 830 kg/m$^3$; a rate of 1.5 to 1.8 m/s is required to fluidise beads with a diameter of 2.4 with an apparent density of 680 kg/m$^3$; a rate of 2.2 m/s is required to fluidise alumina beads with a diameter of 0.1 to 0.2 with an apparent density of 1200 kg/m$^3$. However, if the catalyst is diluted by an equivalent quantity of alumina (inert solid) with an average granulometry of 100–200 microns, fluidisation can be achieved with a linear velocity of 0.2 m/s of air.

Using the process of the invention, the particles of catalyst or adsorbent remain properly dispersed without the particles floating or descending or plunging to the bottom of the vessel. The catalyst or adsorbent particle size is in general in the range 0.5 to 5 millimetres and more frequently in the range 0.8 to 3 mm. The ratio of the catalyst or adsorbent with respect to the inert solid is in the range 0.1 to 1 by weight, preferably in the range 0.1 to 0.3.

As indicated above, the gas can be air diluted to a greater or lesser extent, with the oxygen content being varied by adding pure oxygen or by adding nitrogen or another inert gas, or by dilution with at least a portion of the combustion gases.

As indicated above, the furnace can be constituted by a plurality of zones, for example rectangular in nature with forced circulation from zone to zone through a series of baffles located between the inlets and outlets for the various zones. It is possible to use not a single furnace but a series of furnaces connected together with independent temperature regulation and gas flow rates which can differ from one zone to another of the zones. These zones can be disposed in series or in parallel.

With rotary louvre furnaces or belt furnaces, the present invention has the advantage of having better temperature control and of obtaining short residence times. The better the heat can be evacuated while controlling the bed temperature, the faster suitable burning is obtained by increasing the oxygen content of the gas mixture. The presence of a large mass of inert solid also enables the temperatures to be controlled by preventing the formation of hot spots.

A further major advantage of the process of the invention is to be able to treat mixtures of different catalysts with different granulometries, which is not possible in a direct fluidisation furnace without using an inert solid.

The process of the invention can also reduce the attrition rates and thus the formation of fines, it can homogenise catalysts better, i.e., fewer erratic movements of catalyst particles are observed.

THE FOLLOWING EXAMPLES ILLUSTRATE THE INVENTION

In the first example, the catalyst is regenerated conventionally in a laboratory. In the second example, the catalyst is regenerated in a rotary furnace (rotary louvre furnace) with no genuine fluidisation. In the third example, a furnace is used in which catalyst fluidisation is caused either by air, or by nitrogen, but in this case without an inert solid. In the fourth and fifth examples, the operation is in accordance with the invention: continuous in Example 4, and batchwise in Example 5.

COMPARATIVE EXAMPLE No 1

A petroleum cut hydrotreatment catalyst loses its activity during its industrial cycle by limitation of access to the active sites due to carbon deposits. This poisoning is reversible if the carbon-containing deposit can be eliminated by controlled combustion. In this example, a deactivated catalyst was selected to undergo laboratory regeneration operation under perfectly controlled conditions, to prepare a regenerated solid which could act as a reference to the other tests described below.

Catalyst A, cobalt/molybdenum on an alumina support, was in the form of extrudates with a diameter of 1.2 mm. A sample of 10 g of used catalyst (A), containing 10% by weight of carbon and 8.7% of sulphur, was introduced into a glass reactor, then placed in a vertical furnace. A flow rate of 50 litres/hour of 90/10 vol/vol nitrogen/air mixture traversed the bed of solid. The temperature, measured using a thermocouple placed in the core of the bed, was gradually increased and left for 2 hours at 300° C. then 4 hours at 480° C. The gaseous mixture was then replaced with pure air, and the experiment was continued for 1 hour then stopped. The regenerated catalyst was compared with the corresponding new catalyst, as regards its specific surface area and its catalytic activity for hydrodesulphurisation of petroleum cuts. This was measured in a pilot test using 50 ml of catalyst, at a pressure of 30 bars, a temperature of 350° C., and a gas oil with a sulphur content of 1.71% by weight passed at a space velocity of 1 litre per litre of catalyst per hour.

|  | Fresh catalyst | Used catalyst A | Laboratory regenerated catalyst |
|---|---|---|---|
| Carbon (wt %) | — | 10.0 | 0.12 |
| Sulphur (wt %) | — | 8.7 | 0.19 |
| Specific surface area ($m^2/g$) | 220 | — | 203 |
| Average length (mm) | 3.9 | — | 3.2 |
| HDS activity | 100 (base) | 21 | 95 |

COMPARATIVE EXAMPLE No 2

This example, which is not in accordance with the invention, describes an industrial regeneration operation carried out in a rotary louvre type furnace. The used catalyst (catalyst A) was introduced continuously into an inclined rotary furnace provided with louvres at 300 kg/h. The solid bed circulated over the louvres through which passed a stream of hot air at about 4000 $Nm^3/h$. The velocity of the air traversing the bed was 0.1 m/s and did not actually fluidise the catalyst bed, but nevertheless, because of the rotation of the tube, it caused a slight expansion of the bed which ensured a homogeneous solid/gas exchange. The catalyst bed remained for 4 hours during which exothermic reactions of carbon combustion and metallic sulphide oxidation occurred. A stream of cold air of 5000 $Nm^3/h$ was injected into the head of the furnace so as to remove the heat produced. The temperature profile in the catalyst bed was controlled by the double effect of supplying hot air through the catalyst bed and removing heat via the cooling air so as to maintain the heat level at values close to 500° C. over 80% of the constituted material. Catalyst regeneration controlled in this fashion produced satisfactory performances, however they differed from those of the reference product.

|  | Used catalyst | Laboratory regenerated catalyst from Example 1 | Industrial regenerated catalyst |
|---|---|---|---|
| Carbon (wt %) | 10.0 | 0.12 | 0.28 |
| Sulphur (wt %) | 8.7 | 0.19 | 0.42 |
| Specific surface area ($m^2/g$) | — | 203 | 198 |
| Average length (mm) | — | 3.2 | 3.0 |
| HDS activity | 21 | 95 | 91 |

EXAMPLE 3

Not in Accordance with the Invention

A quantity of 1 litre of catalyst A was introduced into a 20 cm cylindrical furnace provided with a fitted metal hearth enabling gas to be injected which was homogeneously distributed over the whole of the available surface. A 40 $m^3/h$ air stream, preheated to 500° C., was injected through the hearth, and the catalyst bed was fluidised. The temperature of the bed and the vessel increased steadily after injecting hot air. Above about 350° C., the temperature of the bed rose abruptly and exceeded 650° C. After stopping the operation and cooling, the catalyst was analysed. (reference A3-1). Its low surface area, 136 $m^2/g$, due to sintering of the alumina support, confirmed partial destruction of the catalyst and the failure of this regeneration method. This air flow rate of 40 $m^3/h$ was necessary for fluidisation of the bed, but the corresponding excess of oxygen caused runaway of the reaction and overheated the catalyst.

The same experiment was carried out again with nitrogen acting as a fluidisation gas. A device enabled air to be injected in controllable proportions. The catalyst bed was fluidised and heated by 40 $m^3/h$ of nitrogen to 450° C. at which temperature the heating power of the nitrogen was kept constant. At this temperature, air was injected under the sole at a flow rate which depended on the temperature of the bed and was limited to 1 $m^3/h$. The set temperature of the bed was gradually increased to 500° C. After 6 hours, the experiment was stopped and the catalyst was analysed (reference A3-2). It appeared that the presence of nitrogen in place of air, in addition to its function of fluidising the medium, allowed the reaction kinetics and thus its exothermic nature to be controlled, and thus produced a catalyst with interesting properties. In contrast, the technique was of less interest from an economic viewpoint because of the cost of the nitrogen.

|  | Laboratory regenerated catalyst | Regenerated catalyst A 3-1 | Regenerated catalyst A 3-2 |
|---|---|---|---|
| Carbon (wt %) | 0.12 | 0.12 | 0.29 |
| Sulphur (wt %) | 0.19 | 0.10 | 0.28 |
| Specific surface area ($m^2/g$) | 203 | 136 | 201 |
| Average length (mm) | 3.2 | 2.4 | 2.8 |
| HDS activity | 95 | — | 92 |

EXAMPLE 4

Quantities of 1 litre of catalyst A and 6 litres of electro-fused alumina (bulk density 1.7 g/ml, average granulometry 150 microns) were introduced into the furnace described in Example 3. A flow rate of 8 $m^3/h$ of air, preheated to 500° C., fluidised and heated the alumina and catalyst mixture. When the temperature of the bed reached 350° C., the oxidation reactions were triggered, causing a rapid increase in the temperature which rose to 503° C. then fell to 380° C., the heat supplied by the hot air being insufficient to compensate for the heat lost by the furnace walls. A sample of the homogeneous mixture of catalyst and alumina was then removed, screened through a screen with 1 mm interstices, then analysed (reference A 4-1, partially regenerated). It appears that elimination of the carbon and sulphur was not complete, because of an insufficient residence time at high temperature. The experiment was continued under the same dynamic conditions, but supplying heat via an electrical resistance immersed in the bed of fluidised solid. The temperature of the bed was regulated to 500° C. for 1 hour then the experiment was halted and the solid was screened and analysed (reference A4-2).

|  | Laboratory regenerated catalyst | Partially regenerated catalyst A 4-1 | Regenerated catalyst A 4-2 |
| --- | --- | --- | --- |
| Carbon (wt %) | 0.12 | 2.2 | 0.15 |
| Sulphur (wt %) | 0.19 | 1.9 | 0.22 |
| Specific surface area ($m^2/g$) | 203 | — | 207 |
| Average length (mm) | 3.2 |  | 3.0 |
| HDS activity | 95 | — | 93 |

The average length was not substantially reduced. This experiment shows that fluidisation of a mixed alumina/catalyst bed was produced by a gas flow about 5 times lower than those necessary to fluidise a bed of extrudates with a diameter of 1.2 mm. It also shows the feasibility of a fluidised bed regeneration operation, without an inert gas to control the exothermicity of the combustion reaction, and where the temperature is limited because of the role of the heat wheel played by the low granulometry solid.

EXAMPLE 5

The furnace was filled with 3 litres of electrofused alumina identical to that of the previous example. The preheated air was injected at a flow rate of 8 $m^3/h$ and fluidised the alumina. The heating power was regulated so as to produce a stabilised temperature at 430° C. A quantity of 50 grams of catalyst A was then injected into the fluidised bed of hot alumina. The temperature rose rapidly to 490° C., and then 0.2 litres of cold alumina was injected. The temperature dropped to 450° C., partially by the cooling effect due to the cold matter added. About 15 minutes later, a further 50 g of catalyst was added. After rising to 510° C., a further 0.2 litres of alumina was added, and the temperature dropped again to below 450° C. after 15 minutes. The sequence was repeated 6 more times, then the experiment was stopped. The solid was screened and analysed (reference A5).

|  | Laboratory regenerated catalyst | Regenerated catalyst A 5 |
| --- | --- | --- |
| Carbon (wt %) | 0.12 | 0.15 |
| Sulphur (wt %) | 0.19 | 0.23 |
| Specific surface area ($m^2/g$) | 203 | 201 |
| Average length (mm) | 3.2 | 2.9 |
| HDS activity | 95 | 91 |

This example illustrates the possibility of regenerating the catalyst continuously in a furnace with a fluidised sand bed, where the solid to be regenerated would be introduced at one point in the furnace and removed from another point, with circulation between the inlet and outlet points and a residence time centred around an hour.

It further shows the possibility of controlling the heat of the reaction by supplying a second pulverulent solid.

What is claimed is:

1. A process for regenerating first pulverulent solids selected from the group consisting of a catalyst and an adsorbent, said process comprising fluidizing said first pulverulent solids in a fluidizing gas containing molecular oxygen, and adding to said first pulverulent solids second pulverulent solids, said first pulverulent solids having a particle size in the range of 0.5 to 5 millimeters and the second pulverulent solids having an average particle size of less than 300 microns, said first and second pulverulent solids being present in a weight ratio in the range of 0.01:1 to 0.5:1.

2. A process according to claim 1, wherein said ratio is 0.1:1 to 0.3:1.

3. A process according to claim 1, wherein said first pulverulent solid comprises a catalyst, and said second pulverulent solid comprises fines of said catalyst.

4. A process according to claim 3, wherein said fines of the catalyst have a particle size of about 50–80 microns.

5. A process according to claim 1, wherein said second pulverulent solids have a particle size of a maximum of half of the smallest dimension of the pulverulent first solids.

6. A process according to claim 1, wherein said fluidizing is conducted in a vessel having an outlet, and the first pulverulent solids and second pulverulent solids are separated from each other at the outlet from the vessel by screening, and further comprising recycling at least part of the resultant separated second pulverulent solids to said vessel.

7. A process according to claim 6, wherein baffles are disposed in the vessel.

8. A process for regenerating catalysts having a particle size in the range of 0.5 to 5 millimeter, said process comprising fluidizing said catalysts, and adding to said catalysts fines of said catalysts having a substantially lower particle size than 0.5 millimeter, said catalyst being present in a weight ratio to said fines of 0.1:1 to 1:1.

9. A process according to claim 8, wherein said fines have a particle size of about 50–80 microns.

\* \* \* \* \*